United States Patent [19]

Kfir et al.

[11] Patent Number: 5,414,991
[45] Date of Patent: May 16, 1995

[54] PAPER STAPLES AND A PROCESS FOR THE PRODUCTION THEREOF

[75] Inventors: Avi Kfir, Kiryat-Tivon; Adi Halperin, Petah-Tiqwa, both of Israel

[73] Assignee: Promor Ltd., Haifi, Israel

[21] Appl. No.: 36,694

[22] Filed: Mar. 25, 1993

[30] Foreign Application Priority Data

Dec. 28, 1992 [IL] Israel ........................ 104251

[51] Int. Cl.6 .................................. B21G 7/02
[52] U.S. Cl. ............................ 59/77; 59/71; 59/75
[58] Field of Search ................ 59/71, 72, 75, 77

[56] References Cited

U.S. PATENT DOCUMENTS

| 285,640 | 9/1883 | McGill . |
| 538,730 | 5/1895 | Ellingson . |
| 1,184,440 | 5/1916 | Girard . |
| 1,733,506 | 10/1929 | Maynard . |
| 2,013,097 | 9/1935 | Hanna . |
| 2,242,967 | 5/1941 | Carlile . |
| 2,624,085 | 1/1953 | Feiner . |
| 3,128,667 | 4/1964 | Tremblay ................ 59/77 |
| 3,151,443 | 10/1964 | Sitzler ................... 59/77 |
| 4,066,165 | 1/1978 | Ruskin ................... 59/75 |
| 4,112,674 | 9/1978 | Fesquet .................. 59/72 |
| 4,220,070 | 9/1980 | Anstett .................. 85/49 |
| 4,780,038 | 10/1988 | Bach ..................... 411/461 |

FOREIGN PATENT DOCUMENTS

| 8900113 | 8/1990 | Netherlands . |
| 1579236 | 11/1980 | United Kingdom . |
| 2220605 | 1/1990 | United Kingdom . |

Primary Examiner—David Jones
Attorney, Agent, or Firm—Foley & Lardner

[57] ABSTRACT

The invention provides a paper staple having at least one pair of spaced-apart depending paper-engaging prongs and a bridging web connected therebetween, the outer surface of the bridging web having indicia imprinted thereon.

6 Claims, 3 Drawing Sheets

PAPER STAPLES AND A PROCESS FOR THE PRODUCTION THEREOF

The present invention relates to paper staples and to a process for the production thereof.

Paper Staples—meaning staples made of metal for the joining of sheets of paper—have been known for decades and heretofor have been made from an inverted squared u-shaped piece of wire, wherein a plurality of such staples are held together by a layer of lacquer to form a strip of staples which can be inserted in and dispensed from a stapler or stapling gun.

Recently, the present inventors have registered a design for a new type of quadruple-pronged staple, as can be seen in Israel Design 17272 and the corresponding Austrian Design 1389 and the Benelux Design 21299.

Said design registrations, however, do not teach how to mass-produce such staples, nor do they teach or suggest the preferred use thereof, these matters being the subject of the present invention.

Thus, according to the present invention, there is now provided a paper staple having at least one pair of spaced-apart depending paper-engaging prongs and a bridging web connected therebetween, the outer surface of said bridging web having indicia imprinted thereon.

In preferred embodiment of the present invention, the width of said bridging web is at least 2 mm, and the length thereof is at least 6 mm in order to accommodate the imprinting of said indicia.

Preferably the width of said bridging web is at least 3 mm, and the length thereof is at least 7 mm in order to accommodate the imprinting of larger indicia.

As will be realized, the novel staples of the present invention enable companies to distribute literature and other written material which are held together by a staple bearing the company logo or other desired indicia.

The staples of the present invention are preferably mass-produced from sheet or strip metal such as brass, copper alloy, aluminium alloy or preferably galvanized steel, into strips which can be loaded into a purpose-designed stapler as described e.g., in co-pending patent specification.

The invention also provides a process for preparing a strip of paper staples from metal sheet or strip material, comprising inserting said material into a die configured to cut and form said material into at least one strip of a plurality of paper staples having at least one pair of spaced-apart depending paper-engaging prongs, and a bridging web connecting therebetween, the bridging webs of each of said staples having a width of at least 2 mm and a length of at least 6 mm. Said individual staples are sequentially respectively interconnected to an adjacent staple by at least one readily frangible segment of non-cut material extending therebetween.

In a preferred embodiment of the process of the present invention, said material is cut in such a manner whereby the resulting individual staples are sequentially respectively interconnected to an adjacent staple by two spaced-apart readily frangible segments of non-cut material extending between side surfaces of the webs of adjacent staples. Consequently, no lacquer or other extraneous material is needed for the purpose of holding individual staples in a suitable orientation prior to separation at the point of use.

Also provided, according to the present invention, is at least one strip of a plurality of paper staples prepared from sheet or strip metal and having at least one pair of spaced-apart depending paper-engaging prongs and a bridging web connecting therebetween, the bridging webs of each of said staples having a width of at least 2 mm and a length of at least 6 mm. The individual staples are sequentially respectively interconnected to an adjacent staple by at least one readily frangible segment of non-cut material extending therebetween.

The outer surface of said bridging web of each of said staples is imprinted as desired either directly on the metal material or alternatively after the same is painted with a background colour.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
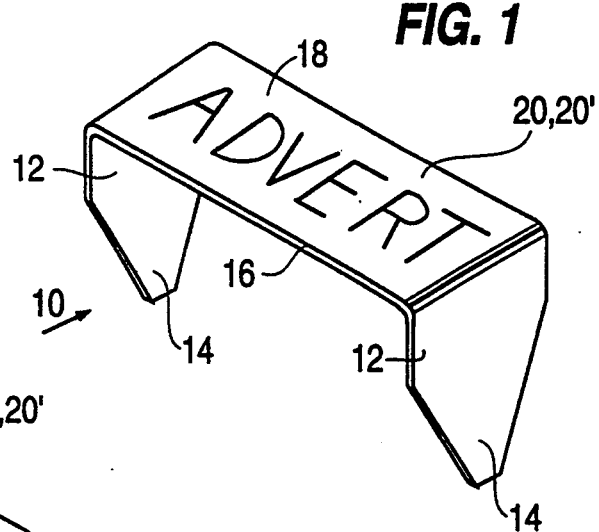
FIG. 1 shows a perspective view of a first embodiment of an individual staple according to the invention.

There is seen in FIG. 1 a paper staple 10 having one pair of spaced-apart depending paper-engaging prongs 12. The prongs 12 are provided with a pointed extremity 14 to better pierce sheets of paper (not shown) without causing tearing thereof. A bridging web 16 is connected between the prongs 12. The outer surface 18 of the bridging web 16 has indicia 20 imprinted thereon. Typically the indicia 20 comprises the company logo or other advertising text. The staple 10 is made from sheet or strip metal, typically 0.3 mm to 0.6 mm thick, such as brass, copper alloy, aluminium alloy or preferably galvanized steel. The material is selected on the basis of having sufficient hardness to pierce multiple paper layers without causing buckling of the prongs 12 under the compression imposed during paper piercing. However, the material selected is sufficiently ductile to allow the execution of a 180 degree bend. As with known staples, during manufacture the prongs 12 are formed by a 90 degree bend, whereas an additional 90 degree end is imposed on the prongs 12 in use after paper piercing.

The bridging web 16 is at least 2 mm wide and the length thereof is at least 6 mm in order to accommodate the imprinting of indicia 20 of minimum size. Where it is required to imprint indicia 20 of larger dimensions for improved legibility, the width of the bridging web 16 is at least 3 mm and the length thereof is at least 7 mm.

Figure 2:
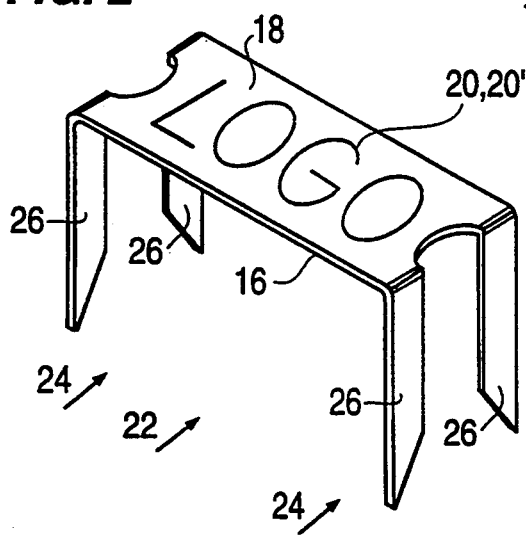
FIG. 2 shows a perspective view of a second preferred embodiment of an individual staple.

FIG. 2 shows a paper staple 22 similar to the staple 10, except that there are provided two sets 24 of spaced-apart depending paper-engaging prongs 26, each set 24 depending from an end of the bridging web 18. The prongs 26 are narrower than the prong 12, thereby providing an advantage in piercing multiple sheets of paper (not shown). This paradoxical situation is explained by consideration of prong 26 as a column under compression during paper piercing. A narrow prong 26 will more nearly approach a square cross-section than a wider prong 12; the square cross section is ideal for resisting buckling under compression. The narrow prong 26 can be made of thicker material without causing paper tearing during piercing.

Figure 3:
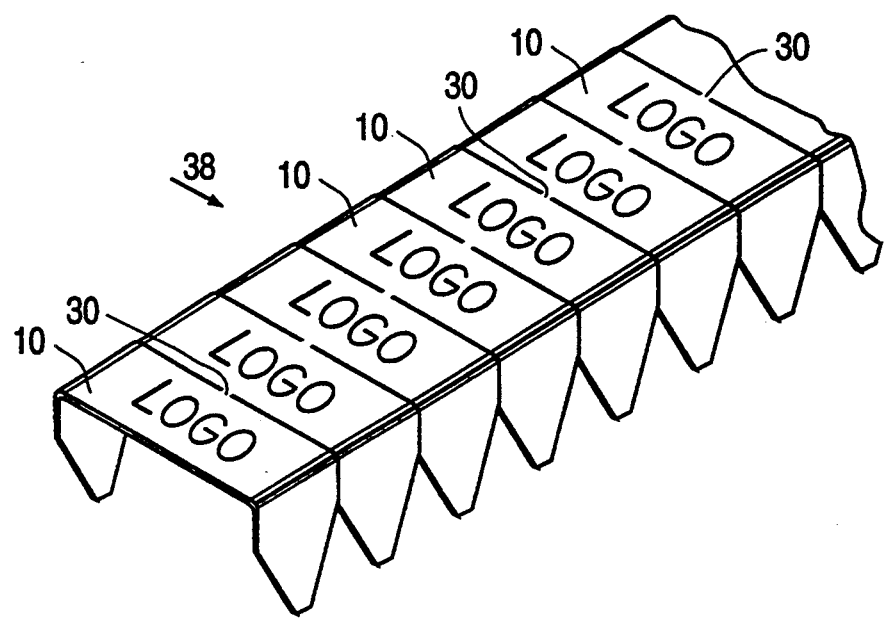
FIG. 3 is a perspective view of a strip of joined staples of the type shown in FIG. 1.

FIG. 3 shows a strip 28 composed of a plurality of paper staples 10 as described with reference to FIG. 1. The individual staples 10 are sequentially respectively interconnected to an adjacent staple 10 by a readily frangible segment 30 of non-cut material extending therebetween.

The strip 28 is designed to be loadable into a purpose-designed stapler (not shown). In operation, the driving ram of said stapler breaks the segment 30 at the moment of use to separate a single staple 10 from the strip 28.

As will be noted, the strip 28 has an advantage over the individual staple 10 in providing convenience of loading said stapler. Furthermore, it is much easier to imprint the strip 28 as shown on the outer surface 18 of the bridging web 16 of each of the staples 10 before breaking the segment than attempting the imprinting of individual staples 10.

PROCESSES

The present invention also provides for processes for preparing the strip 28 of paper staples from metal sheet or strip material 32.

PROCESS A

Figure 4:
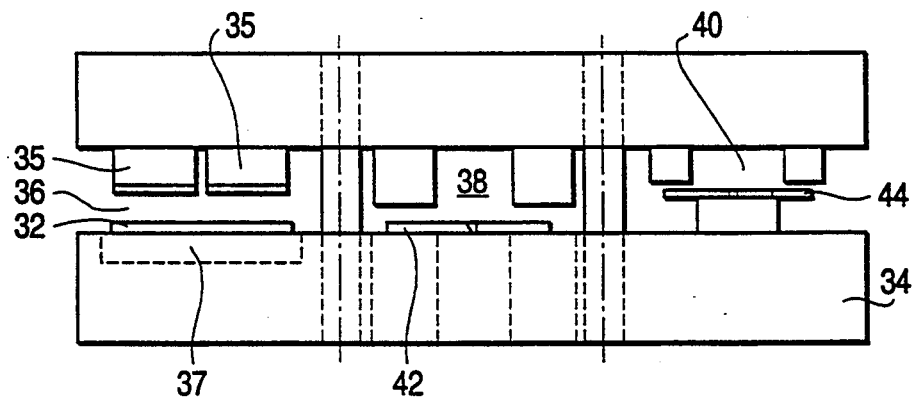
FIG. 4 is a diagramatic view of a die used in the described Process A for manufacturing a strip of staples.

1. A die 34 shown schematically in FIG. 4 is prepared configured to cut and form material 32 into one strip 38 of a plurality of paper staples 10, the bridging webs 16 of each of said individual staples being sequentially respectively interconnected to an adjacent staple 10 by one readily frangible segment 30 of non-cut material extending therebetween. The die 34 has three material feed openings 36, 38, 40 and may be used to carry out each operation sequentially or simultaneously.
2. The die 34 is assembled on a press (not shown).
3. Material 32 is inserted into the first die opening 36 for cutting between positions to be later formed into adjacent staples 10. Press operation causes the die 34 to cut the material 32, leaving a central segment 30 (seen in FIG. 3) uncut.

Cutting is achieved by sharp knives 35 which apply pressure on the material 32, support being provided to the material 32 by a slotted steel base 37 configured to allow entry to the knives 35.

4. The partially cut part 42 is removed from the die 34 and re-inserted in opening 38 for notching the perimeter of the prongs 12.
5. The fully-blanked part 44 is removed from the die 34 and inserted in opening 40 for bending the prongs 12.

The die 34 is intended for medium volume production. A process for high volume production will be described with reference to Process D.

PROCESS B

The material 32 is cut in a manner whereby the resulting individual staples 10 are sequentially respectively interconnected to an adjacent staple by two spaced-apart readily frangible segments 46 of non-cut material extending between side surfaces of the webs of adjacent staples. The use of two frangible segments 46 proves a more dimensionally stable strip than a single centrally located frangible segment 30.

Figure 5:
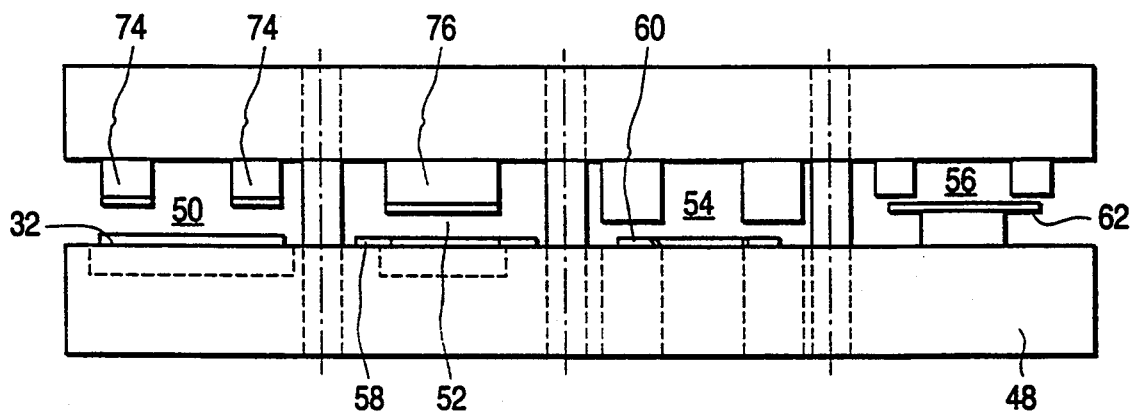
FIG. 5 is a diagramatic view of a die used in Process B for manufacturing a strip of staples.

FIG. 5 shows a die 48 having four side-by-side material feed openings 50, 52, 54, 56. The die 48 is arranged for the execution of a process similar to that of Process A, except that the cutting operation is executed in two stages instead of one stage.

The process steps are:
1. The die 48 is assembled on a press (not shown).
2. Material 32 is inserted into the die opening 50 and the press is operated for cutting along lines separating the prongs 12 of adjacent staples 10.

Preferably the die includes at least two sets of cutting knives for partially severing the material between adjacent staples, as will be described with reference to FIG. 7. Partially cut strip 58 is then removed.

3. The strip 58 is inserted into the die opening 52 and the sides of the bridging web 16 are cut, these new cuts almost joining the cuts described in stage 2, there remaining two small uncut segments 46.
4. The partially cut part 60 is removed from the die 48 and re-inserted in opening 54 for notching the perimeter of the prongs 12 seen in FIG. 1.
5. The fully-blanked part 62 is removed from the die 48 and re-inserted in opening 56 for bending of the prongs 12.

PROCESS C

Process C is a 5-step process for preparing a strip 64 of paper staples 22 of the type shown in FIG. 2 having two sets of spaced-apart depending paper-engaging prongs 26, each of said sets of prongs depending from an end of a bridging web 28.

Process C is identical to Process B except that the notching operation described in step 4 forms the prongs 26 according to the shape shown in FIG. 2.

PROCESS D

This ia mass-production process for preparing a strip 66 of paper staples 22 from metal sheet or strip material 68.

Figure 6:
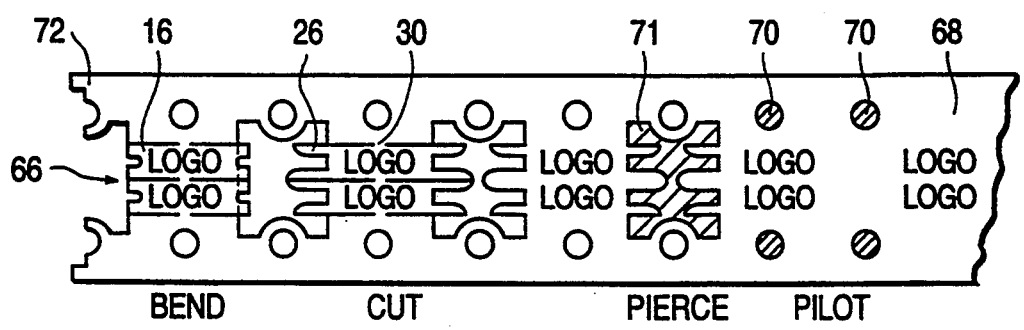
FIG. 6 is a plan view of material being converted into a strip as from a mass-production die.

There is seen in FIG. 6 a strip of material 68 being formed into a staple strip 66 by a sequence of discrete operations performed by a mass-production die (not shown).

The strip 66 is shown for illustrative purposes as carrying only 2 staples over its width. An actual strip will carry between 20 to 40 staples at each station.

The die comprises a press tool containing a series of mathematically related stages which perform a sequence of discrete operations upon the advancing strip of material 68.

Material 68 is inserted into the die which is configured to cut pierce and bend material 68 into strips 66 of a plurality of paper staples 22 having two pairs of spaced-apart depending paper-engaging prongs 26. A bridging web 16 connects therebetween, the bridging webs 16 of each staple 22 having a width of at least 2 mm and a length of at least 6 mm. The individual staples are sequentially respectively interconnected to an adjacent staple by one readily frangible segment 30 of non-cut material extending therebetween.

Examination of the strip of material shown indicates that the die used for its manufacture is arranged to carry out the following sequence of operations:

1. Pierce two pilot holes 70 at each side of the material 68. It will be noted that the material carrying the pilot holes is subsequently cut off and rejected, the purpose of the pilot holes being to facilitate precise transfer of the material between stations.
2. Pierce the prong area 71. An alternative arrangement would be to carry out this operation after cutting.
3. Cut to partially separate individual staples; a central uncut segment 30 remains.
4. Bend both sets of prongs 26 by 90 degrees.

At least one complete staple strip is produced for each press stroke.

The staple strip 66 is shown remaining attached to the side strips 72. Under certain circumstances this is preferable to cutting off in the press, as the attached strip is easily handled, for example for the purpose of printing, storing or packaging.

Figure 7:
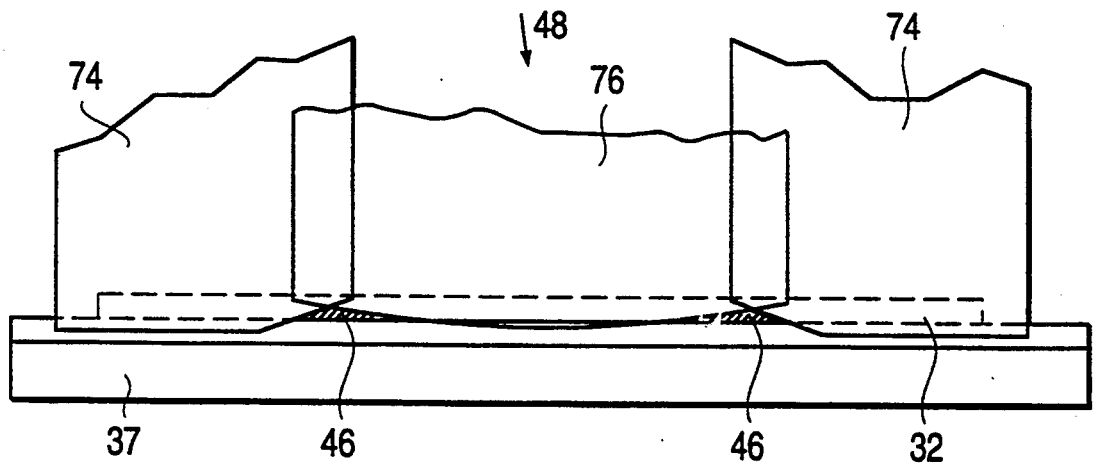
FIG. 7 is a diagramatic detail of a preferred knife arrangement in a die for manufacturing staple strips.

FIG. 7 shows a detail of a die 48 used in a process wherein cutting of the material 32 is effected while leaving two frangible segments 46 joining adjacent staples. The die is provided with two sets of sharp cutting edges 74, 76 of a die punch which are pressed onto the material 32 for partially severing the material between adjacent staples. A first, double set of side punching edges 74 is arranged to cutting the material at each side between the prongs of adjacent staples. A second set of central knives 76 is arranged to subsequently partially cut the remaining material to define the edges of bridging members of adjacent staples.

Support is provided to the material 32 by a slotted steel base 37 to allow entry to the punching edges. Two spaced-apart readily frangible segments 46 of non-cut material remain, extending between side surfaces of the webs of adjacent staples.

Figure 8:
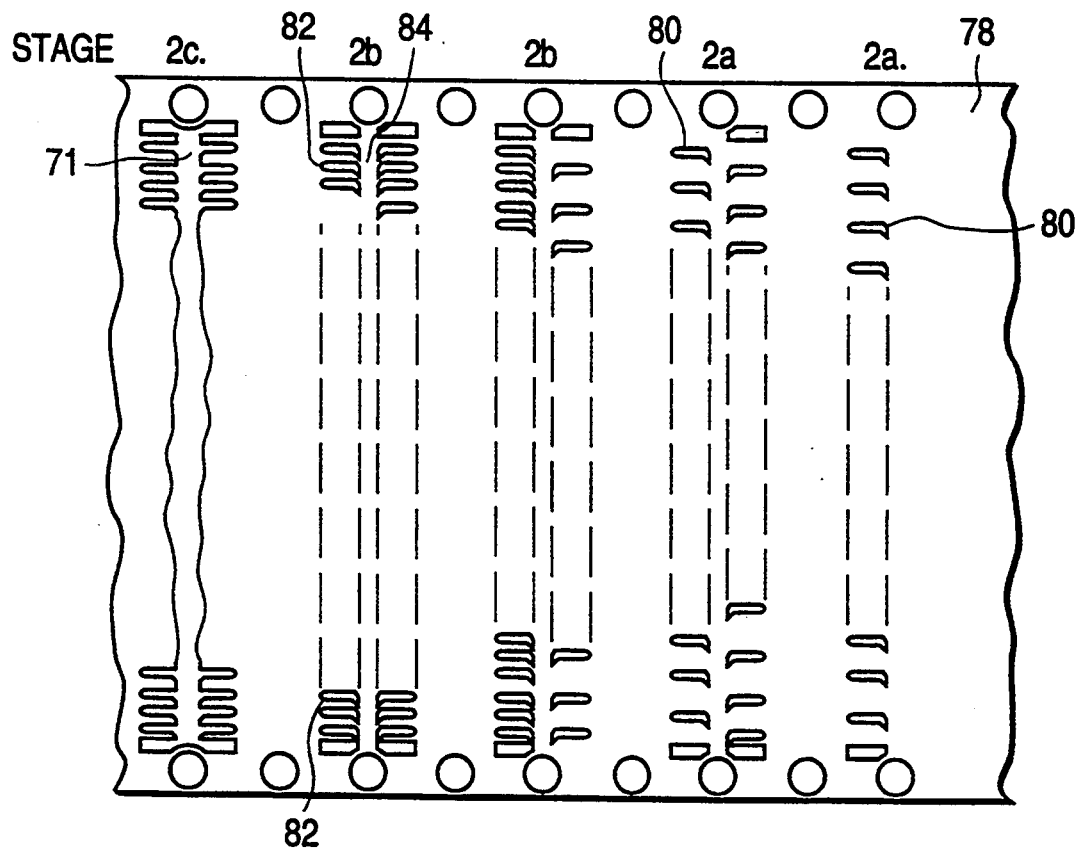
FIG. 8 is a further plan view of material being converted into a staple strip as from a mass-production die, where the piercing operation is carried out in several stages.

FIG. 8 shows strip material 78 which has been processed in a press tool of the type used in Process D. However, examination of the strip 78 reveals that the piercing of the prong area 71 has been carried out in several stages:

Stage 2a: Pierce alternate recesses 80 shaped similar to a J or L but with only a partially formed foot.
Stage 2b: Pierce remaining recesses 82 of identical shape to 80.
Stage 2c. Cut out the centre, herring-bone shaped strip 84 to complete blanking of the prongs 26.

One of the advantages of piercing in progressive stages lies in the provision of more space to allow the use of thicker and sturdier punches and to produce a less fragile die.

As will be realised a major advantage achieved according to the present invention is that after said cutting edges of the die punch have cut away most of the connecting material between two adjacent staples the staples are nevertheless interconnected with what appears to be zero space between adjacent staples while being held together by readily frangible segments of non-cut material extending between side surfaces of the webs of adjacent staples.

It will be evident to those skilled in the art that the invention is not limited to the details of the foregoing illustrative embodiments, and that the present invention may be embodied in other specific forms without departing from the essential attributes thereof, and it is therefore desired that the present embodiments be considered in all respects as illustrative and not restrictive, reference being made to the appended claims, rather than to the foregoing description, and all changes which come within the meaning and range of equivalency of the claims are therefore intended to be embraced therein.

What is claimed is:

1. A process for preparing a strip of paper staples from metal sheet or strip material, comprising inserting said material into a die configured to cut all the way through portions of said material without deforming or removing said material and form said material into at least one strip of a plurality of paper staples having at least one pair of spaced-apart depending paper-engaging prongs and a bridging web connected therebetween, the bridging webs of each of said staples having a width of at least 2 millimeters and a length of at least 6 millimeters, wherein said individual staples are sequentially respectively interconnected by at least one readily frangible segment of non-cut material extending between side surfaces of the webs of adjacent staples, wherein cut and undeformed side surfaces of the webs of adjacent staples abut each other with an imperceptible separation, and imprinting an outer surface of the bridging webs of each of said staples with indicia.

2. The process as claimed in claim 1, wherein said material is cut in such a manner whereby the resulting individual staples are sequentially respectively interconnected by two spaced apart readily frangible segments of non-cut material extending between side surfaces of the webs of adjacent staples, and wherein cut and undeformed side surfaces of the webs of adjacent staples abut each other with an imperceptible separation.

3. The process as claimed in claim 1 for preparing a strip of paper staples having two parts of spaced-apart depending paper-engaging prongs, each of said prongs depending from an end of said bridging web.

4. The process as claimed in claim 1, wherein said die comprises a press tool containing a series of mathematically related stages which perform a sequence of discrete operations upon an advancing strip of metal, said operations including at least one piercing, one cutting and one bending operation.

5. The process as claimed in claim 1, wherein said die includes at least two sets of cutting knives for partially severing the material between adjacent staples, a first set of punching edges cutting the material between the prongs of adjacent staples, and a second set of punching edges partially cutting the remaining material to define the edges of bridging members of adjacent staples and leaving two spaced-apart readily frangible segments of non-cut material extending between side surfaces of the webs of adjacent staples.

6. The process of claim 1, wherein a thickness of said at least one readily frangible segment of non-cut material is substantially equal to a thickness of said side surface of said webs.

* * * * *